(12) United States Patent
Rawlings

(10) Patent No.: US 6,535,969 B1
(45) Date of Patent: Mar. 18, 2003

(54) METHOD AND APPARATUS FOR ALLOCATING FREE MEMORY

(75) Inventor: Scott L. Rawlings, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 295 days.

(21) Appl. No.: 09/594,376

(22) Filed: Jun. 15, 2000

(51) Int. Cl.⁷ .................................................. G06F 12/02
(52) U.S. Cl. ........................................................ 711/170
(58) Field of Search ................................ 711/170, 171, 711/173; 707/205

(56) References Cited

U.S. PATENT DOCUMENTS 5,675,790 A * 10/1997 Walls .......................... 395/621

OTHER PUBLICATIONS

Walker, "Butter Allocation Routines", Jul. 1972.*
Walker, "The BGET Memory Allocator", Aug. 21, 1996.*
Knowlton, "A Fast Storage Allocator", 10/65, p.623–625, ACM vol. 8 No. 10.*

* cited by examiner

Primary Examiner—Kevin L. Ellis
(74) Attorney, Agent, or Firm—Suiter & Associates, PC

(57) ABSTRACT

A method and system for allocating and freeing memory in an electronic system allocates available memory by including at least one or more flags that indicate the size and status of the allocated segment in the same area in which the segment is allocated. A free portion in the available memory is searched such that the free portion is sufficient to accommodate the requested segment. Upon finding a free portion, a new segment is created in the free portion where the new segment includes an allocated segment equal in size to the requested segment and further includes a segment area that accommodates at least one flag of the allocated segment such that the segment area is adjacent to the allocated segment. At least one flag of the allocated segment is set, and may include a size flag or a status flag that indicates whether the allocated segment is occupied and whether the allocated segment is the last segment.

15 Claims, 4 Drawing Sheets

METHOD AND APPARATUS FOR ALLOCATING FREE MEMORY

BACKGROUND

The present invention relates generally to a method and system for managing the dynamic allocation and freeing of memory during program execution in electronic systems.

In general purpose electronic computer systems, most compilers typically provide a standard set of library functions that allocate and free memory. The provided libraries are given a starting address and region size based upon the operating system being used to execute the program. In an embedded system such as an Advanced Reduced Instruction Set Computer System (RISC) Machine (ARM) based system with no operating system defined at compile time, these library functions are not available. Thus, there lies a need for a method and system that is capable of allocating and freeing memory where library functions to implement such routines are unavailable. Furthermore, it is desirable to provide a method for allocating and freeing memory in systems without requiring intervention by the operating system even where the library functions may be available.

SUMMARY

The present invention is directed to a method and system for allocating and freeing memory in an electronic system. In one embodiment of the present invention, the method and system implement a step and structure for receiving a request to allocate a requested segment of available memory, a step and structure for searching for a free portion in the available memory, the free portion being sufficient to accommodate the requested segment, upon finding a free portion, a step and structure for creating a new segment in the free portion, the new segment including an allocated segment equal in size to the requested segment and further including a segment area that accommodates at least one flag of the allocated segment, the segment area being adjacent to the allocated segment, and a step and structure for setting the flag of the allocated segment.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1A:
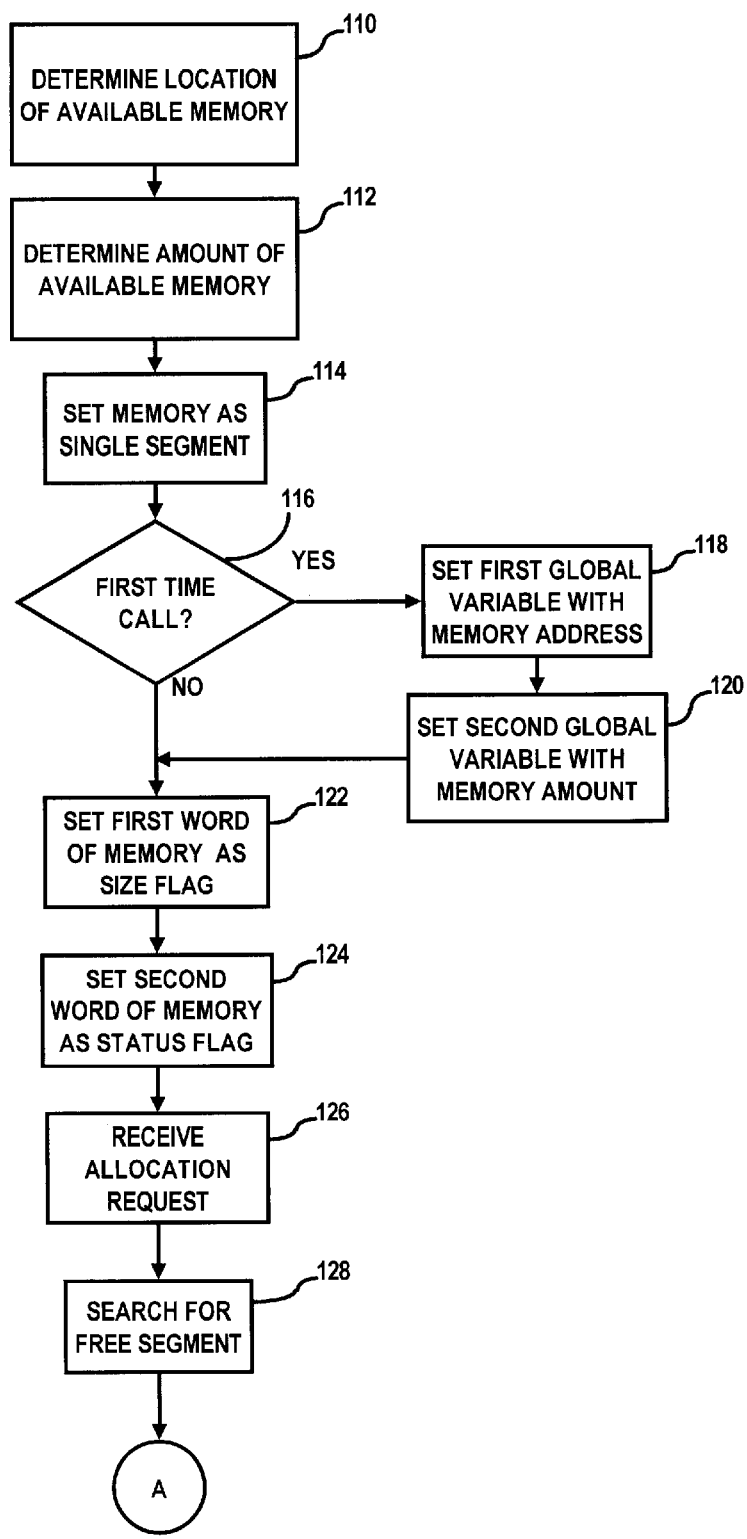
FIGS. 1A and 1B show a flow diagram of method for allocating memory in accordance with the present invention.
Figure 1B:
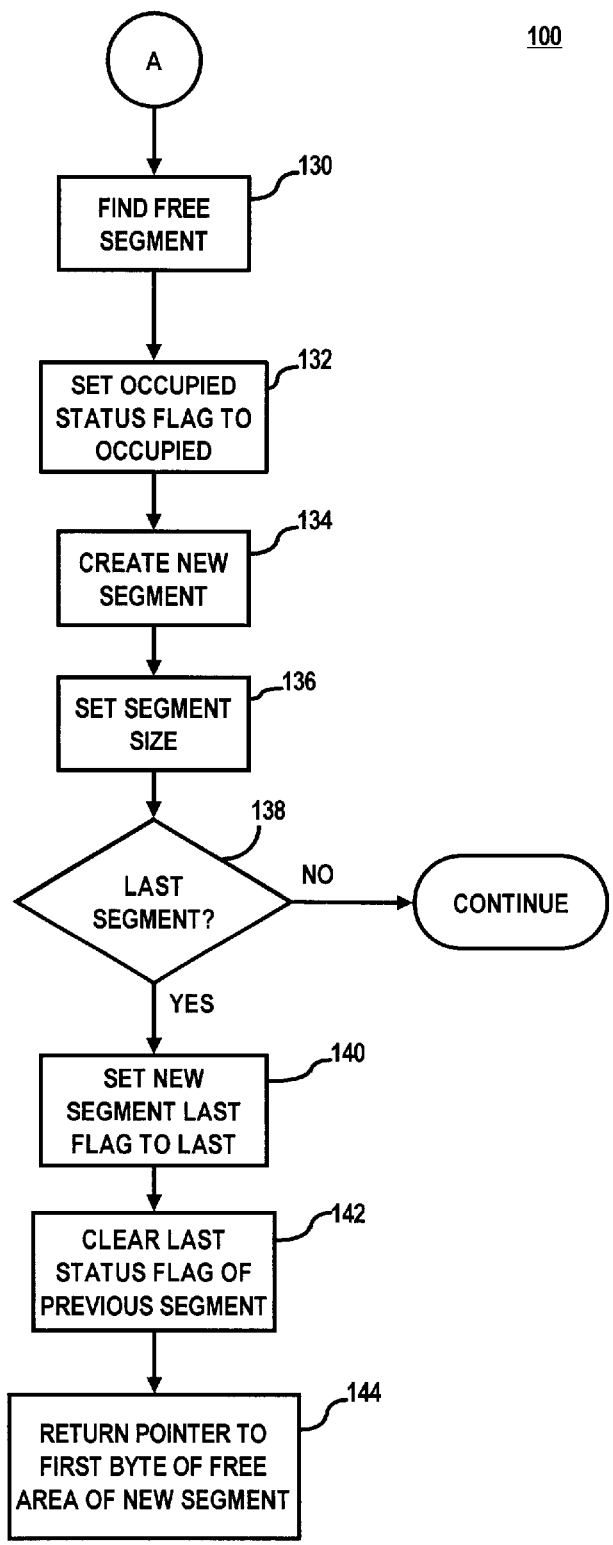

Referring now to FIGS. 1A and 1B, a flow chart of a method for allocating free memory in accordance with the present invention will be discussed. Method 100 is implemented in one embodiment as computer code executing on a machine such as a general-purpose computer or in an embedded system such as an Advanced RISC Machine (ARM) controller. An example of such a controller is the LSI 53c1510 Single Chip RAID Controller available from LSI Logic Corporation of Milpitas, California. In one embodiment, method 100 is executed as computer code derived from a C or C++ programming language source code. Alternatively, method 100 may be implemented in a Disk Operating System (DOS) program of a general-purpose computer. An example of a system capable of executing method 100 is shown in and described with respect to FIG. 3. Upon a startup event, method 100 begins with the step 110 of determining the location of available memory in the system. The amount of available memory in the system is determined at step 112. The entire allocated memory region starts out being considered one large segment so that the available memory is initially set as a single segment at step 114. A determination is made at step 116 whether the current execution of method 100 is a first time call in a given session. Before the first time call of memory allocation method 100, there are two global variables that are set up with the base memory address of the region to be managed, and the size of that region. Thus, a first global variable is set with the memory address as step 118, and a second global variable is set with the memory amount at step 120. In one embodiment of the present invention, for example with the LSI 53c1510 controller, steps 118 and 120 are executed after the startup code has determined the location and amount of available memory as executed at steps 112 and 114, respectively. The first two words of the segment are used as flags in method 100. In one embodiment, the first two flags are 32-bit sized words, although other word sizes may be utilized without providing substantial change to the scope of the invention. The flags give the size and status of the segment. The status word has two elements, an "occupied" status flag, and a "last" status flag. The size word contains the size of the available memory in the segment and does not include the two flag words. Thus, a first word in the memory segment is set as a size flag at step 122, and a second word in the memory segment is set as a two element status flag at step 124. When a memory allocation request is received at step 126, a search is made through the memory region at step 128 to search for a free segment that is large enough to accommodate the allocation request. In one embodiment, search step 128 is implemented by walking through the memory region using the size word of the current segment to determine where the next segment begins.

Once a sufficiently large segment is found at step 130, the "occupied" status flag is set at step 132. If the found segment is larger than the request size, for example in one embodiment 12 or more bytes larger than the request size, then a new segment is created that includes an allocated segment at step 134 at the end of the current segment. The size of an allocated segment is set at step 136. In one particular embodiment of the invention, the size of the new segment set at step 136 is defined as the new segment size less the request size less 8 bytes. The 8-byte differential is utilized to account for the two new flag words associated with the newly allocated segment. A determination is made at step 138 whether the current segment was the last segment. If the current segment was the last segment in the region, then the "last" status flag of the new segment is set at step 140, and the "last" status flag of the current segment is cleared at step 142. Lastly, a pointer to the first byte after the two flag words in the newly allocated memory segment is returned to the requesting function at step 144.

Figure 2:
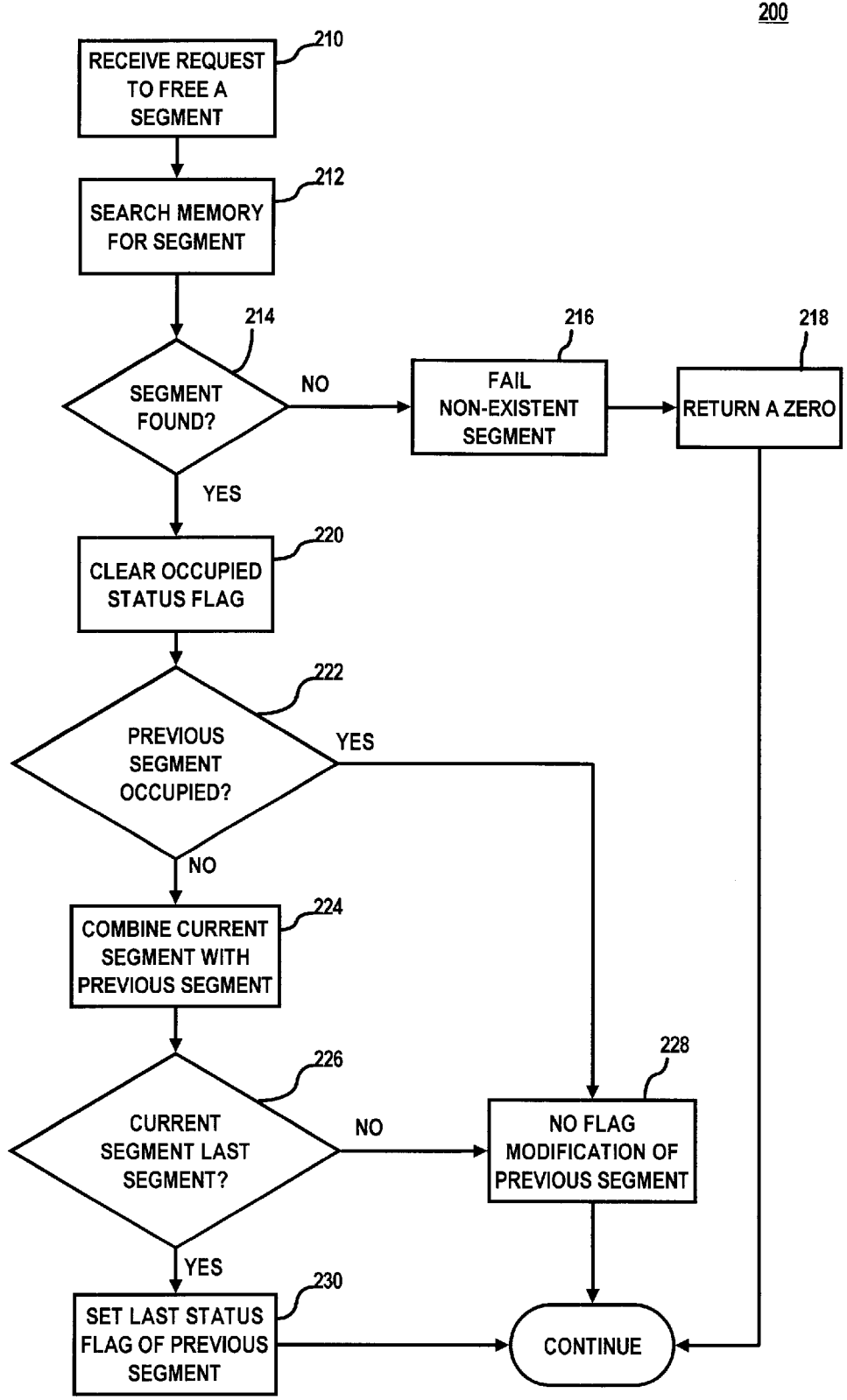
FIG. 2 is a flow diagram of a method for freeing a memory segment in accordance with the present invention.

Turning now to FIG. 2, a method for freeing a memory segment in accordance with the present invention will be discussed. Method 200 may be executed in a similar manner and on a similar system as discussed with respect to method 100 of FIG. 1. When a request is received at step 210 to free a memory segment, a search of the memory region is made at step 212 to find the requested segment in question. Search step 212 is executed in a substantially similar manner as method 100 for finding an empty memory segment to allocate. A determination is made at step 214 whether the requested segment is found. If the last segment is reached and no match has been found, then the request was for a non-existent segment as indicated at step 216, and a zero is returned at step 218 to indicate to the calling program that the free failed. If the requested segment is found, its "occupied" status flag is cleared at step 220. Method 200 then checks at step 222 whether the previous segment is occupied. In the event the previous segment is unoccupied, then the current segment is combined into the previous segment at step 224, and if the current segment was the last segment as determined at step 226, then the "last" status flag of the previous segment is set at step 230. If the previous segment is occupied, then its flags are not modified as indicated at step 228. After dealing with the previous segment, the next segment is checked whereby the procedure of method 200 is continued in a likewise manner as for the previous segment. In such an arrangement, all adjacent free segments are combined to provide larger free segments for future allocations.

An advantage of methods 100 and 200 of the present invention over other methods is that no segment table is required to be maintained in program memory. As a result, memory space is freed for other uses. Additionally, method 100 and 200 in accordance with the present invention do not leave memory in a broken up, non-contiguous state when segments are freed. In accordance with the present invention, adjacent free segments are combined during the freeing process, thereby maximizing the size of free segments. Another advantage of the present invention is that the location, status, and size of each segment are not stored in a list or an array separate from the memory being allocated. In accordance with the present invention, the total number of segments of any size that could be created is not limited by such a table for which a limited amount of space would be allocated; instead, in accordance with the present invention, such information is dynamically stored for each allocated segment only when needed by placing the information that defines and gives the status for each segment into the allocated memory region itself. Methods 100 and 200 in accordance with the present invention are useful for embedded applications that do not have an operating system to manage memory. Furthermore, methods 100 and 200 are useful to programs wherein it is desirable to further divide up memory allocated by the operating system (OS) without further OS intervention. The number and order of the steps of methods 100 and 200 need not be limited to the number and order of the steps shown in FIGS. 1A, 1B, and 2. The number and order of the steps, including fewer or greater steps, may be altered or changed without providing substantial change to the scope of the present invention.

Figure 3:
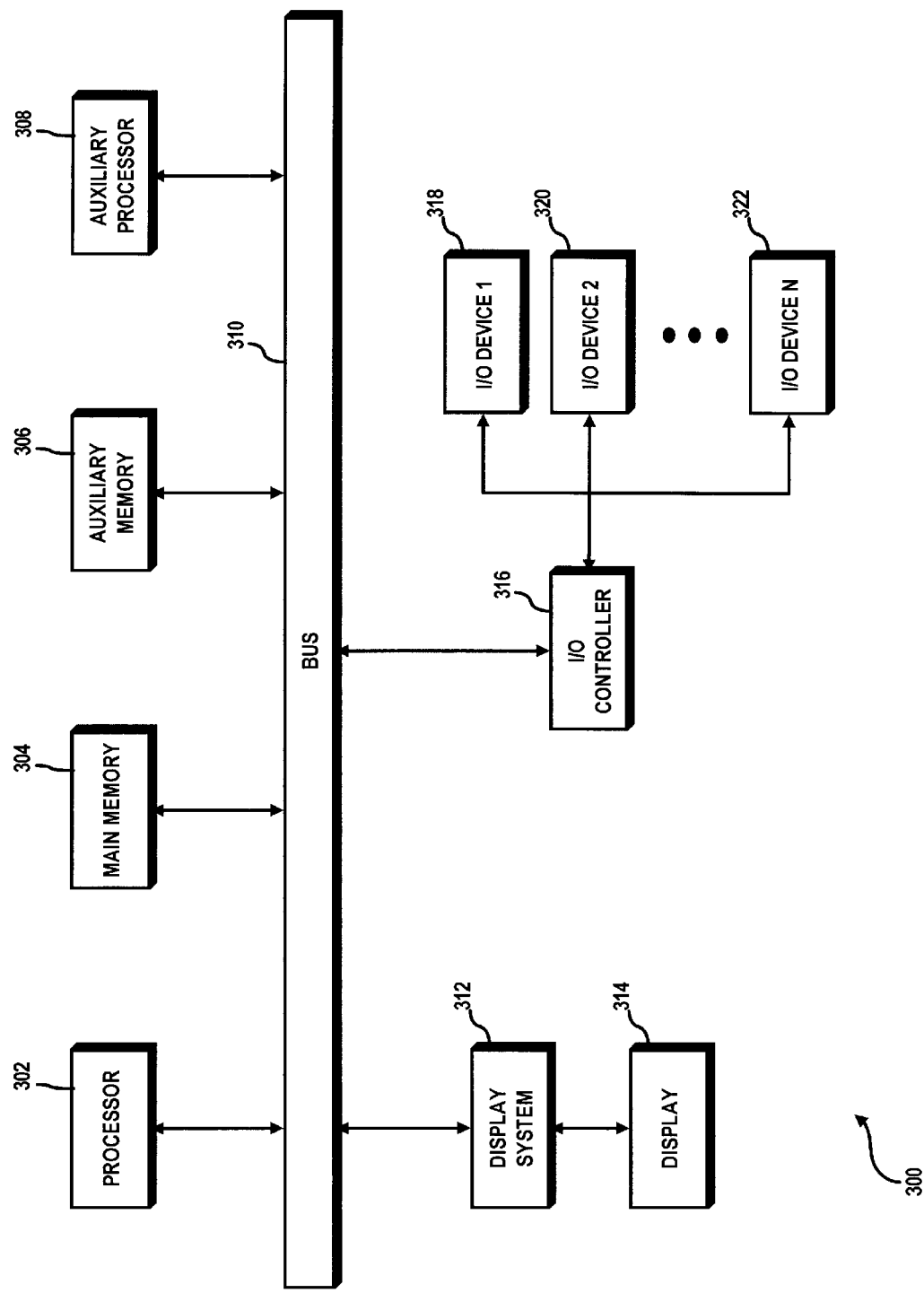
FIG. 3 is a block diagram of a computer system operable to embody the present invention.

Referring now to FIG. 3, a hardware system in accordance with the present invention is shown. The hardware system shown in FIG. 3 is generally representative of the hardware architecture of a controller or computer system embodiment of the present invention. Hardware system 300 may be configured to implement method 100 of FIGS. 1A and 1B, and method 200 of FIG. 2. A central processor 302 controls hardware system 300. Central processor 302 includes a central processing unit such as a microprocessor or microcontroller for executing programs, performing data manipulations and controlling the tasks of hardware system 300. Communication with central processor 302 is implemented through a system bus 310 for transferring information among the components of hardware system 300. Bus 310 may include a data channel for facilitating information transfer between storage and other peripheral components of hardware system 300. Bus 310 further provides the set of signals required for communication with central processor 302 including a data bus, address bus, and control bus. Bus 310 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 310 may be compliant with any promulgated industry standard. For example, bus 310 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of hardware system 300 include main memory 304, auxiliary memory 306, and an auxiliary processor 308 as required. Main memory 304 provides storage of instructions and data for programs executing on central processor 302. Main memory 304 is typically semiconductor based memory such as dynamic random access memory (DRAM) and or static random access memory (SRAM). Auxiliary memory 306 provides storage of instructions and data that are loaded into the main memory 304 before execution. Auxiliary memory 306 may include semiconductor-based memory such as read-only memory (ROM), programmable read-only memory (PROM) erasable programmable read-only memory (EPROM), electrically erasable programmable read-only memory (EEPROM), or flash memory (block oriented memory similar to EEPROM). Auxiliary memory 306 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Hardware system 300 may optionally include an auxiliary processor 308, which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Hardware system 300 further optionally includes a display system 312 for connecting to a display device 314, and an input/output (I/O) system 316 for connecting to one or more I/O devices 318, 320, up to N number of I/O devices 322. Display system 312 may comprise a video display adapter having all of the components for driving the display device, including video random access memory (VRAM), buffer, and graphics engine as desired. Display device 314 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 316 may comprise one or more controllers or adapters for providing interface functions between one or more of I/O devices 318–222. For example, input/output system 316 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, track pad, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electro-acoustic transducer, microphone, speaker, etc. Input/output system 316 and I/O devices 318–322 may provide or receive analog or digital signals for communication between computer system 300 of the present invention and external devices, networks, or information sources. Input/output system 316 and I/O devices 318–322 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of hardware system 300 of FIG. 3 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 304 of one or more hardware systems configured generally as described in FIG. 3. Until required by the hardware system, the set of instructions may be stored in another computer readable memory such as auxiliary memory 306 of FIG. 3, for example in a hard disk drive or in a removable memory such as an optical disk for utilization in a CD-ROM drive, a floppy disk for utilization in a floppy disk drive, a floppy-optical disk for utilization in a floppy-optical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus for allocating free memory of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method, comprising:

receiving a request to allocate a requested segment of available memory;

searching for a free portion in the available memory, the free portion being sufficient to accommodate the requested segment;

upon finding a free portion, creating a new segment in the free portion, the new segment including an allocated segment equal in size to the requested segment and further including a segment area that accommodates at least one flag of the allocated segment, the segment area being adjacent to the allocated segment; and setting said at least one flag of the allocated segment, wherein at least one flag setting step includes setting a size flag indicating the size of the allocated segment and setting a status flag indicating whether the allocated segment is occupied.

2. A method as claimed in claim 1, further comprising the step of determining whether the allocated segment is the last segment, and in the event the allocated segment is the last segment, executing said flag setting step by setting a status flag indicating whether the allocated segment is a last segment in the available memory.

3. A method as claimed in claim 1, further comprising the step of, in the event there is a previous segment having a flag indicating that the previous segment was the last segment, clearing the flag of the previous segment that indicates that the previous segment was the last segment.

4. A method as claimed in claim 1, further comprising the step of returning a pointer to a first byte of the allocated segment.

5. A method as claimed in claim 1, further comprising the steps of freeing at least a portion of the new segment, and while executing said freeing step, in the event an adjacent segment is unoccupied, combining the new segment with the adjacent segment.

6. A program of instructions impressible upon a medium capable of being read by a machine, the program of instructions for causing a machine to implement steps for allocating free memory according to the program of instructions, the steps comprising:

receiving a request to allocate a requested segment of available memory;

searching for a free portion in the available memory, the free portion being sufficient to accommodate the requested segment;

upon finding a free portion, creating a new segment in the free portion, the new segment including an allocated segment equal in size to the requested segment and further including a segment area that accommodates at least one flag of the allocated segment, the segment area being adjacent to the allocated segment; and setting said at least one flag of the allocated segment, wherein at least one flag setting step includes setting a size flag indicating the size of the allocated segment and setting a status flag indicating whether the allocated segment is occupied.

7. A program of instructions as claimed in claim 6, the steps further comprising the step of determining whether the allocated segment is the last segment, and in the event the allocated segment is the last segment, executing the flag setting step by setting a status flag indicating whether the allocated segment is a last segment in the available memory.

8. A program of instructions as claimed in claim 6, the steps further comprising the step of, in the event there is a previous segment having a flag indicating that the previous segment was the last segment, clearing the flag of the previous segment that indicates that the previous segment was the last segment.

9. A program of instructions as claimed in claim 6, the steps further comprising the step of returning a pointer to a first byte of the allocated segment.

10. A program of instructions as claimed in claim 6, the steps further comprising the steps of freeing at least a portion of the new segment, and while executing said freeing step, in the event an adjacent segment is unoccupied, combining the new segment with the adjacent segment.

11. An apparatus, comprising:

means for receiving a request to allocate a requested segment of available memory;

means for searching for a free portion in the available memory, the free portion being sufficient to accommodate the requested segment;

means for creating a new segment in the free portion upon said searching means finding a free portion, the new segment including an allocated segment equal in size to the requested segment and further including a segment area that accommodates at least one flag of the allocated segment, the segment area being adjacent to the allocated segment; and means for setting said at least one flag of the allocated segment, wherein at least one flag setting step includes means for setting a size flag indicating the size of the allocated segment and means for setting a status flag indicating whether the allocated segment is occupied.

12. An apparatus as claimed in claim 11, further comprising means for determining whether the allocated segment is the last segment, said flag setting means setting a status flag indicating whether the allocated segment is a last segment in the available memory in the event said determining means determines that the allocated segment is the last segment.

13. An apparatus as claimed in claim 11, further comprising means for clearing the flag of the previous segment that indicates that the previous segment was the last segment in the event there is a previous segment having a flag indicating that the previous segment was the last segment.

14. An apparatus as claimed in claim 11, further comprising means for returning a pointer to a first byte of the allocated segment.

15. An apparatus as claimed in claim 11, further comprising means for freeing at least a portion of the new segment, and means for combining the new segment with an adjacent segment in the event the segment is occupied.

* * * * *